United States Patent [19]
Hopkin et al.

[11] Patent Number: 5,932,804
[45] Date of Patent: Aug. 3, 1999

[54] VIBRATING STRUCTURE GYROSCOPE

[75] Inventors: Ian David Hopkin; Christopher Paul Fell; Kevin Townsend; Timothy Robert Mason, all of Plymouth, United Kingdom

[73] Assignee: British Aerospace Public Limited Company, United Kingdom

[21] Appl. No.: 09/021,306

[22] Filed: Feb. 10, 1998

[30] Foreign Application Priority Data

Feb. 18, 1997 [GB] United Kingdom .................... 9703357

[51] Int. Cl.$^6$ ........................................................ G01P 9/04
[52] U.S. Cl. ......................................................... 73/504.13
[58] Field of Search ............................. 73/504.13, 504.12, 73/504.04, 514.02, 514.15; 310/329, 369, 366

[56] References Cited

U.S. PATENT DOCUMENTS

| | | | |
|---|---|---|---|
| 3,924,475 | 12/1975 | Stiles ..................................... | 73/504.13 |
| 4,655,081 | 4/1987 | Burdess ................................. | 73/504.13 |
| 5,060,039 | 10/1991 | Weinberg et al. ...................... | 357/26 |
| 5,203,208 | 4/1993 | Bernstein .............................. | 73/504.12 |
| 5,226,321 | 7/1993 | Varnham et al. ....................... | 73/505 |
| 5,696,323 | 12/1997 | Hulsing, II ............................ | 73/504.12 |

*Primary Examiner*—Hezron Williams
*Assistant Examiner*—Helen C. Kwok
*Attorney, Agent, or Firm*—Kenyon & Kenyon

[57] ABSTRACT

A vibrating structure gyroscope has a vibratory resonator having a substantially ring or hoop-like shape structure, an electromagnetic drive for causing the resonator to vibrate, a support structure including a plurality of flexible support beams for supporting the resonator whilst allowing it to vibrate and an electromagnetic sensor for sensing movement of the resonator. The support beams and resonator are made from silicon and the electromagnetic drive and sensor include metal tracks which extend externally along each support beam onto and along respective segments of an outer substantially planar surface of the ring-like resonator. The resonator is substantially planar and means is produced a magnetic field substantially perpendicular to the plane of the resonator.

9 Claims, 5 Drawing Sheets

VIBRATING STRUCTURE GYROSCOPE

FIELD OF THE INVENTION

This invention relates to a vibrating structure gyroscope.

BACKGROUND OF THE INVENTION

Vibrating structure gyroscopes function as a result of developed Coriolis forces which occur when a particle undergoes linear motion in a rotating frame of reference. Practical implementations of this technology are described in U.S. Pat. No. 5,226,321 and U.S. Pat. No. 4,655,081. U.S. Pat. No. 5,226,321 discloses the use of a planar hoop or ring like structure for the vibrating element or resonator of such a vibrating structure gyroscope, which resonator structure may be conventionally machined or micromachined using silicon processing technology.

These planar structures are typically excited into a cos 2θ resonance mode. For a perfectly symmetric resonator, the cos 2θ mode actually exists as a degenerate pair of vibration modes at a mutual angle of 45°. These are shown schematically in FIGS. 1A and 1B in which vibration of the structure is shown about primary axes P and secondary axes S. Thus FIGS. 1A and 1B show the resonator shape at the two points of extreme deformation during a single vibration cycle.

One of these modes (FIG. 1A) is excited as the carrier mode. When the structure is rotated around the axis normal to the plane of the ring, Coriolis forces couple energy into the second response mode (FIG. 1B) The amplitude of motion of the response mode gives a direct measure of the applied rotation rate.

U.S. Pat. No. 5,226,321 further discloses that the resonator may be driven into excitation by various means, preferably electromagnetic, but including optical, thermal expansion, piezo-electric or electrostatic effects, with vibration of the resonator being sensed preferably by electrostatic (capacitive) means.

Such a known structure has a number of disadvantages. Firstly the capacitive vibration sensing means or pick-off are sensitive to vibration in the plane perpendicular to the plane of vibration of the resonator which can make the gyro sensitive to vibration inputs. Secondly the use of capacitive pick-offs necessitates the use of very small gaps between the pick-offs and vibrating resonator in order to achieve sensitivity. Small gaps cause a yield problem during manufacture from silicon wafers because of the problem of stiction which prevents the resonator part from releasing from the remainder of the silicon structure during the manufacturing etch process. A further disadvantage is that the design is asymmetric and this requires subsequent orientation of the sensing means or pick-offs during final assembly. Asymmetry in the resonator structure further contributes to the splitting of the Cos 2θ mode frequencies which degrades sensor performance.

OBJECTS OF THE INVENTION

Thus one object of the present invention is to provide a generally improved vibrating structure gyroscope which at least minimizes the foregoing disadvantages.

This and other objects and advantages of the present invention will become more apparent from details disclosed in the following specification where preferred embodiments of the invention are described.

SUMMARY OF THE INVENTION

According to one aspect of the present invention there is provided a vibrating structure gyroscope including a substantially planar vibratory resonator having a substantially ring or hoop like shape structure with inner and outer peripheries extending around a common axis, electromagnetic drive means for causing the resonator to vibrate, support means including a plurality of flexible support beams for supporting the resonator and for allowing the resonator to vibrate in response to the electromagnetic drive means in a substantially undamped oscillation mode such as to permit the resonator to move relative to the support means in response to turning rate, which support beams and resonator are made from silicon, and electromagnetic sensing means for sensing movement of the resonator, which electromagnetic drive and electromagnetic sensing means include metal tracks on the ring or hoop like shape structure resonator and on the support beams, together with means for generating or providing a magnetic field substantially perpendicular to the plane of the vibratory resonator.

Preferably the support means also includes a frame which is substantially rigid, surrounds the resonator and is coupled to the outer periphery of the ring or hoop-like shape structure by the support beams which extend between the support means and resonator.

Conveniently the gyroscope has eight equi-angularly spaced support beams.

Advantageously each support beam is provided with three laterally spaced tracks extending externally along its length which are connected at their outermost ends with respect to the resonator to bond pads and two of which at their innermost ends extend in opposite directions around an outer substantially planar surface of the resonator over a segment thereof, and connect at their innermost ends to a respective one of the tracks on the immediately adjacent support beam, with the number of segments corresponding to the number of support beams.

Preferably of the three laterally spaced side by side tracks on each support beam, the centre track extends onto the resonator and terminates thereon adjacent the junction of the support beam and resonator to provide a means for minimizing electrostatic coupling between the other two tracks on the support beam.

Conveniently the gyroscope includes a silicon oxide layer on said outer substantially planar surface of the resonator and support beams, between said tracks and the silicon of the support beams and resonator, to insulate the tracks from the silicon, connecting points being provided through the silicon oxide layer at appropriate positions connecting the centre track to the silicon to reduce unwanted capacitive signal coupling between adjacent tracks.

Advantageously the gyroscope includes means for passing current through an appropriate segment track to provide drive for the resonator and the sensing means is such as to detect vibration of the resonator by detecting a voltage generated across an appropriate segment track as it moves in the perpendicular magnetic field.

Preferably the gyroscope includes ring pole means for concentrating the magnetic field on the ring or hoop-like area of the resonator.

Conveniently the gyroscope includes a housing made of magnetic material for containing the resonator, magnetic field means, support means, electromagnetic drive means and electromagnetic sensing means, with a non-magnetic spacer being provided between the housing and support means.

DESCRIPTION OF THE DRAWINGS

For a better understanding of the present invention and to show how the same may be carried into effect, reference will now be made by way of example, to the accompanying drawings, in which.

DESCRIPTION OF EMBODIMENTS OF THE INVENTION

A vibrating structure gyroscope according to the present invention as illustrated in FIGS. 2 to 7 of the accompanying drawings, includes a substantially planar vibratory resonator 1 having a substantially ring or hoop-like shape structure with inner and outer peripheries 2 and 3 respectively extending around a common axis 4. The gyroscope includes electromagnetic drive means as will be hereinafter described for causing the resonator to vibrate and electromagnetic sensing means, as will be hereinafter described in more detail, for sensing movement of the resonator 1.

Additionally, support means are provided including a plurality of flexible support beams 5 for supporting the resonator 1 and for allowing it to vibrate in response to the electromagnetic drive means in a substantially undamped oscillation mode, such as to permit the resonator 1 to move relative to the support means in response to turning rate. The support beams 5 and resonator 1 are made from silicon.

Figure 2:
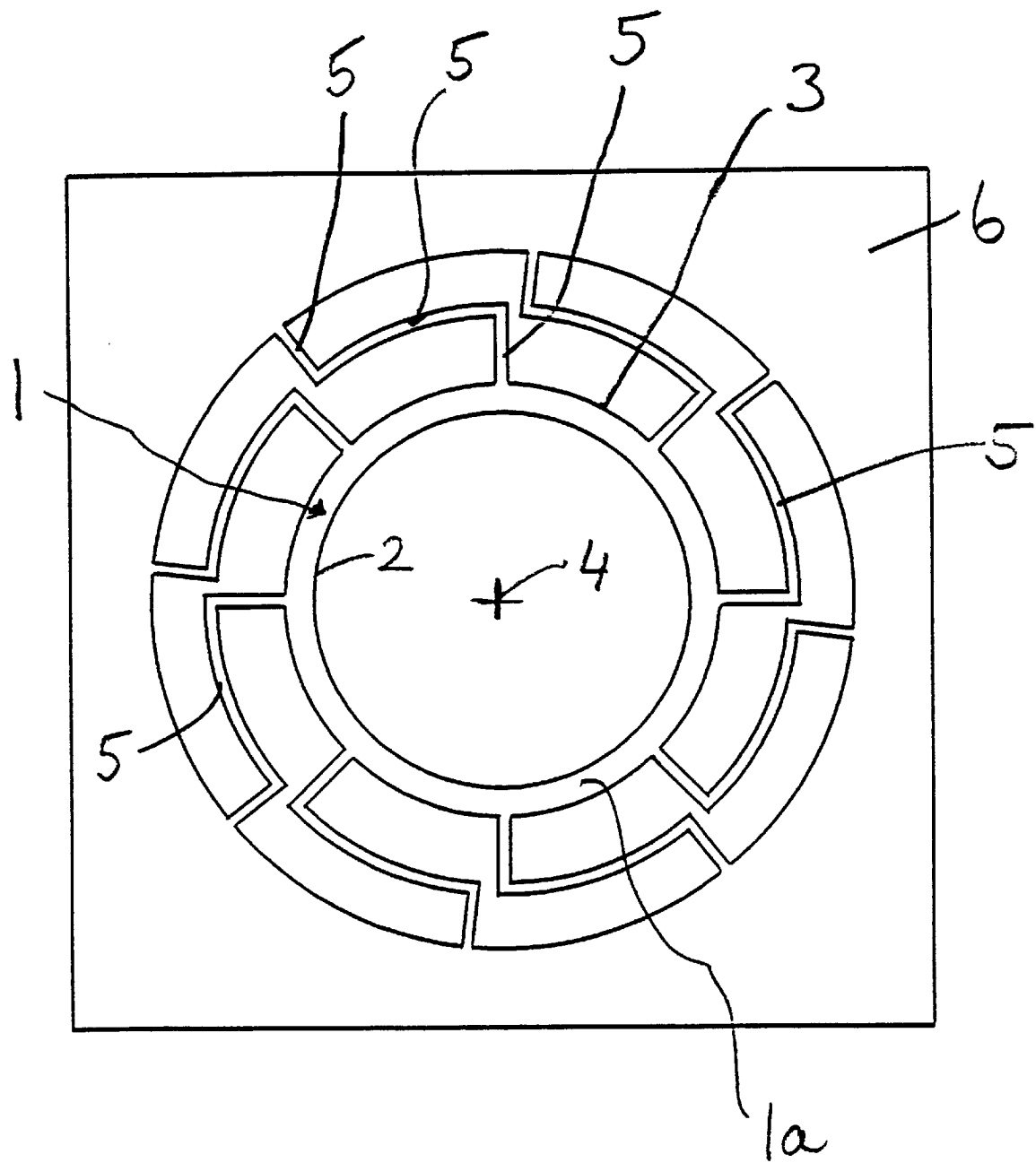
FIG. 2 is a plan view of part of a vibrating structure gyroscope according to the present invention, shown for convenience without tracks.
Figure 4:
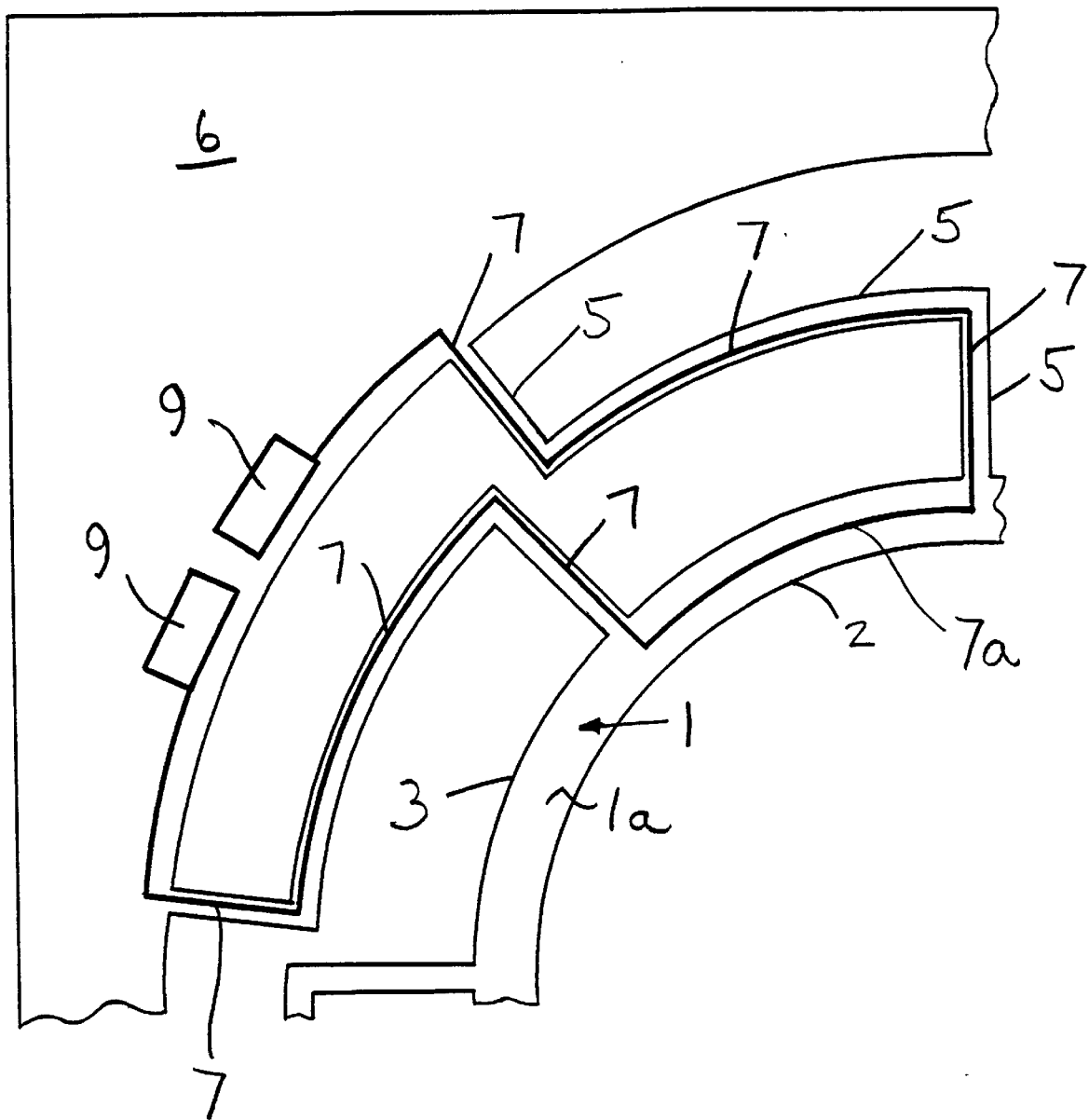
FIG. 4 is a plan view to an enlarged scale of a further detail of FIG. 2.
Figure 5:
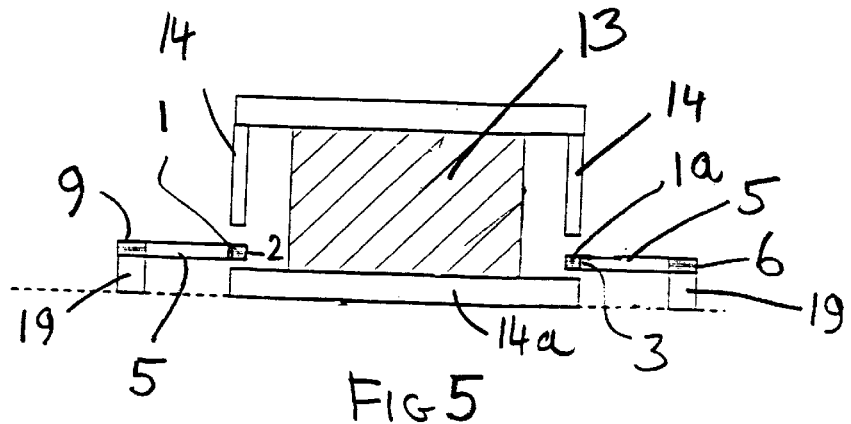
FIG. 5 is a schematic vertical cross sectional view through the gyroscope of FIGS. 2 and 4 with additional parts thereof shown.

As can be seen from FIGS. 2, 4 and 5 in particular, the support means also includes a frame 6 which is substantially rigid, surrounds the resonator 1 and is coupled to the outer periphery 3 of the ring or hoop-like shaped structure 1 by the support beams 5 which extend between the support frame 6 and the resonator 1. In the example illustrated the gyroscope has eight equi angularly spaced support beams 5 which represents the optimum preferred number.

Any irregularity or imperfection in the ring structure will give rise to a mismatch between the carrier and response mode frequencies which will degrade the performance of the gyroscope. A single support beam attached to the ring resonator will therefore differentially shift the carrier and response mode frequencies. However, eight identical support beams evenly spaced around the ring circumference will have an identical affect on the carrier and response modes and will not therefore generate a frequency split. This will be true for any feature with the same periodicity. It is thus advantageous to use eight support beams 5 spaced evenly around the ring resonator 1.

Figure 1B:
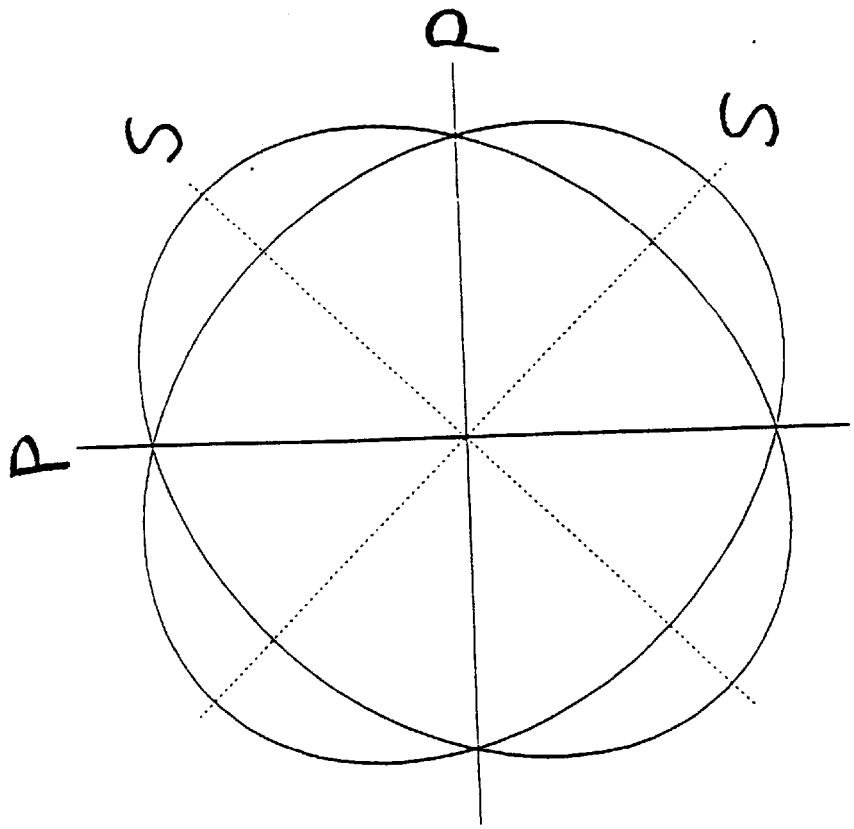
FIGS. 1A and 1B are diagrammatic views showing vibration in the Cos 2θ mode of a vibrating structure gyroscope resonator according to the present invention.
Figure 1A:
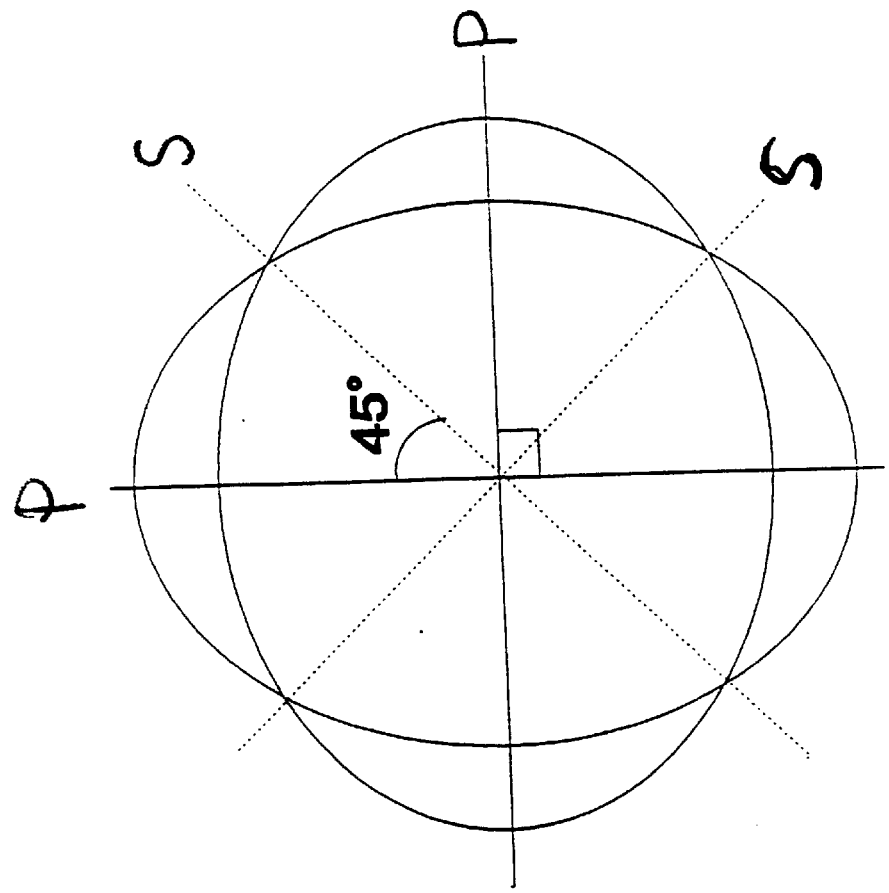
Figure 3:
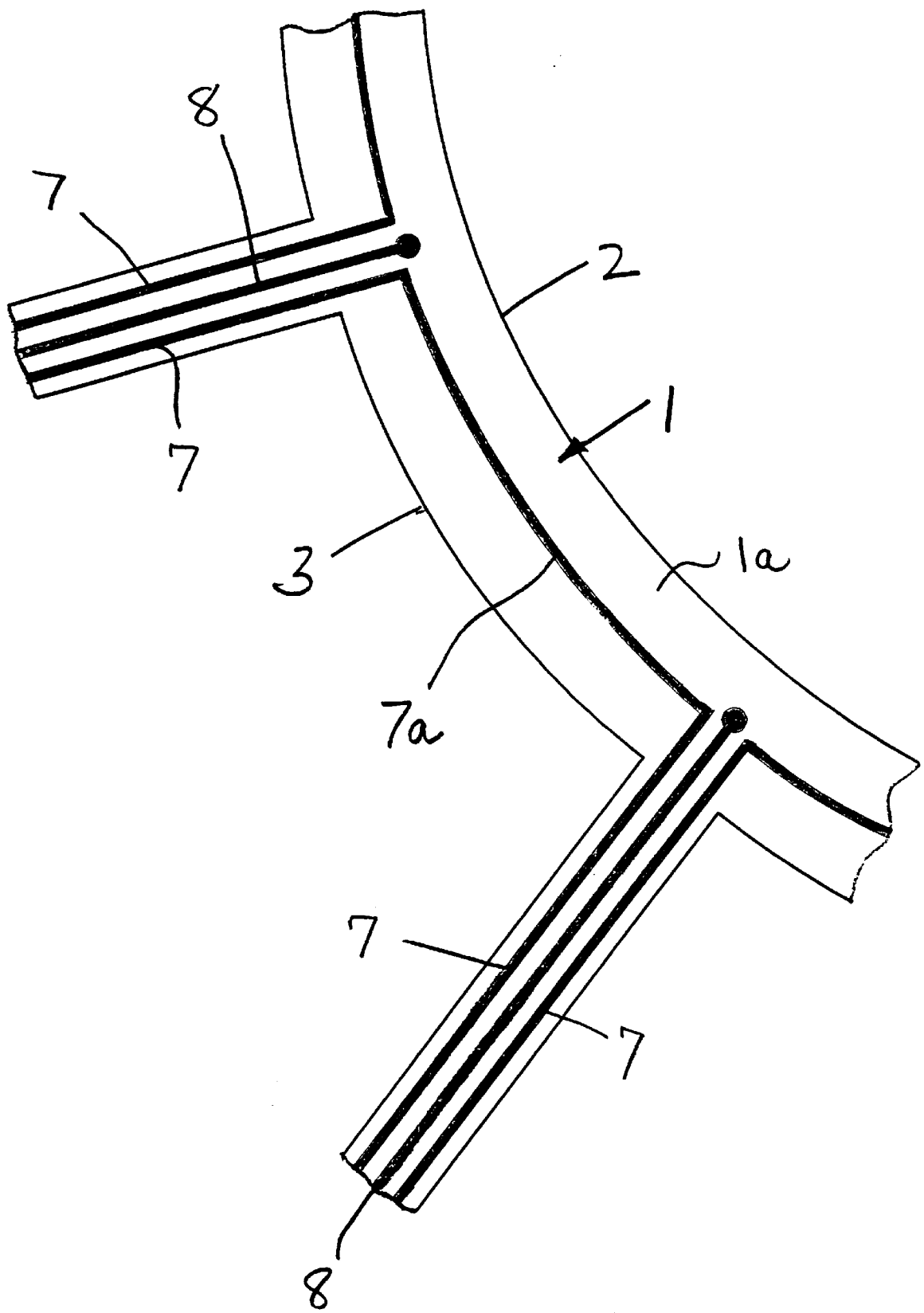
FIG. 3 is a plan view to an enlarged scale of a detail of FIG. 2.
Figure 6:
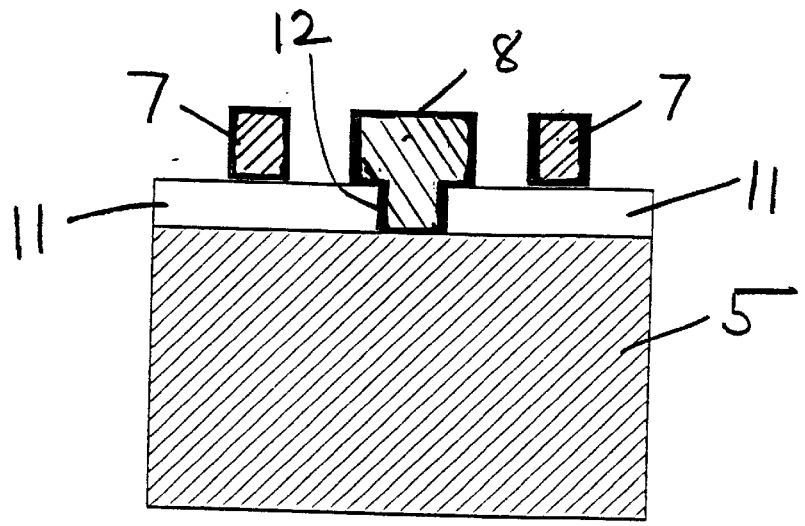
FIG. 6 is a cross sectional view to an enlarged scale through a support beam such as shown in FIGS. 2, 3 and 4

The electromagnetic drive and the electromagnetic sensing means include metal tracks on the resonator 1 and on the support beams 5, together with means for generating or providing a magnetic field substantially perpendicularly to the plane of the vibratory resonator 1. Thus each support beam 5 is provided with three laterally spaced tracks namely two outermost tracks 7 and an innermost central track 8 as can be seen best from the cross sectional view through a support beam 5 as illustrated in FIGS. 3 and 6. The tracks extend externally along the length of each support beam 5 and are connected at their outermost ends with respect to the resonator 1 to bond pads 9 as seen in FIG. 1. The two tracks 7 at their innermost ends extend in opposite directions around an outer substantially planar surface 1a of the resonator 1 over a segment thereof, as shown in FIG. 3, and connect at their innermost ends to a respective one of the tracks 7 on the immediately adjacent support beam 5 with the number of segments corresponding to the number of support beams 5. Thus two tracks 7 on adjacent support beams 5 together define an interconnecting segmental track section 7a on the outer substantially planar surface 1a of the resonator 1 as can be seen from FIG. 3.

The tracks 7 and 8 are made of metal and may be produced using standard evaporation and patterning techniques used in the silicon wafer processing industry. Of the three laterally spaced side by side tracks 7, 8 on each support beam 5 and associated resonator segment, the centre track 8 extends onto the resonator 1 and terminates thereon adjacent the junction of the support beam 5 and resonator 1 as can be seen in FIG. 3, to provide a means for minimizing electrostatic coupling between the other two tracks 7 on the support beam 5.

A silicon oxide layer 11 is provided on the outer substantially planar surface 1a of the resonator 1 and support beams 5 as can best be seen from FIG. 6, between the tracks 7, 8 and the silicon of the support beams 5 and resonator 1. The layer 11 insulates the tracks 7 and 8 from the silicon but connecting points such as 12 are provided through the silicon oxide layer 11 at appropriate positions connecting the centre track 8 to the silicon of the beam 5 to reduce unwanted capacitive signal coupling between adjacent tracks 7. Thus the entire track system lies on top of the silicon oxide layer 11 which isolates the tracks from the silicon substrate which is conductive. The layout of the track pattern shown in FIG. 3 and FIG. 4 minimizes any inductive coupling between tracks but it is to be understood that any other suitable arrangements of the tracks may be utilised as desired.

For a Cos 2θ mode of vibration the ideal number of support beams for the resonator 1 is eight. Thus there are eight identical metal track segments 7a on the hoop or ring-like shape structure of the resonator 1 which are in sympathy with the eight beams 5 as shown in FIG. 2. Because this pattern conforms to the Cos 2θ modal pattern it has the advantage that it does not cause any detrimental effects to the modes such as frequency splitting.

The tracks 7, 8 are made of any suitable metal such as aluminium or gold and means are provided for passing current through an appropriate segment track 7 and 7a to provide drive for the resonator 1. The sensing means is such as to detect vibration of the resonator 1 by detecting a voltage generated across an appropriate segment track 7, 7a as it moves in the perpendicular magnetic field.

The means for generating or providing the magnetic field includes a magnet 13 and ring pole means 14 for concentrating the magnetic field on the ring or hoop-like area of the resonator 1. The poles 14, 14a and the magnet 13 form a magnetic circuit which concentrates a perpendicular magnetic field in the region of the ring resonator 1. The field, Bg in the gap between poles 14 and 14a approximates to $$Bg = \frac{-\mu oHmlm}{lg} \quad (1)$$

where $\mu o$ is the permittivity of free space, lg is the length of the gap between poles 14 and 14a, lm is the length of the magnet 13 and Hmlm is the magnetomotence of the magnet 13 at the operating point on its BH curve. The operating point is set by the magnetic loading $\mu_{lm}$, which is controlled by the magnetic circuit, such that $$\mu_{lm} = \frac{Bm}{\mu Hm} = \frac{-Aglm}{Amlg} \quad (2)$$

where Ag is the area of the gap between the poles, Am is the area of the magnet and lm and lg are as previously stated and Bm is the magnetic B field within the magnet 13. The parameters within the magnetic circuit are chosen so as to set the operating point of the magnet at or near to its maximum energy condition, which thermally stabilises the magnet. At the same time the circuit parameters are chosen so as to maximise the field in the gap between the poles, in the region of the ring resonator, while maintaining achievable assembly tolerances.

Conveniently the magnetic material is chosen to be Samarium Cobalt ($Sm_2Co_{17}$), which provides a high field intensity while having a low thermal sensitivity compared to other materials such as iron based magnets.

The magnetic circuit also serves to load the magnet 13 to its ideal state so that it is thermally stabilised. Driving forces are produced by passing current through an appropriate track segment and the force F that results is given by:

$$F=BgI.1 \quad (3)$$

where Bg is the magnetic field in the gap, I is the current through the track, and 1 is the length of track 7 in the field. The resonator 1 may be set into resonant oscillation by applying an oscillating current I sin ωt with ω=2πf where f is the Cos 2θ resonant frequency.

The resonator vibration is detected as a voltage across an appropriate track segment as it moves in the perpendicular magnetic field and is given by:

$$V=v_1Bg1=2\pi f.a.Bg1 \quad (4)$$

where Bg and 1 are as above and $v_1$ is the peak velocity of the vibration, f is the Cos 2θ resonant frequency and a is the amplitude of the vibration.

By concentrating the magnetic field over the ring or hoop-like area of the resonator 1 not only are the signals maximised but unwanted signals, due to movement of track sections on the support beams, are avoided. It will also be noticed that the drive and pick-off elements provided by the tracks 7 are identical which greatly simplifies the design of processing masks used for manufacture of the structures The simple design also reduces the number of masks required and avoids the requirement for small gaps. The design is clearly symmetric which not only benefits the vibration modes as described but also avoids the need for an orientation operation when packaging. Because the electromagnetic sensing or pick-off means requires motion perpendicular to the magnetic field to develop a signal, it is insensitive to vibration parallel to the magnetic field and thus avoids sensitivity to unwanted vibrations perpendicular to the plane of the device.

It will be seen from the drive equation (3) and sensing or pick-off, equation (4) that both are linear in that the drive force is directly proportional to the applied current, and the pick-off signal is directly proportional to the amplitude of motion. As such the transfer function of the gyroscope is linear which results in the advantage of producing very good gyro scale factor linearity.

Figure 7:
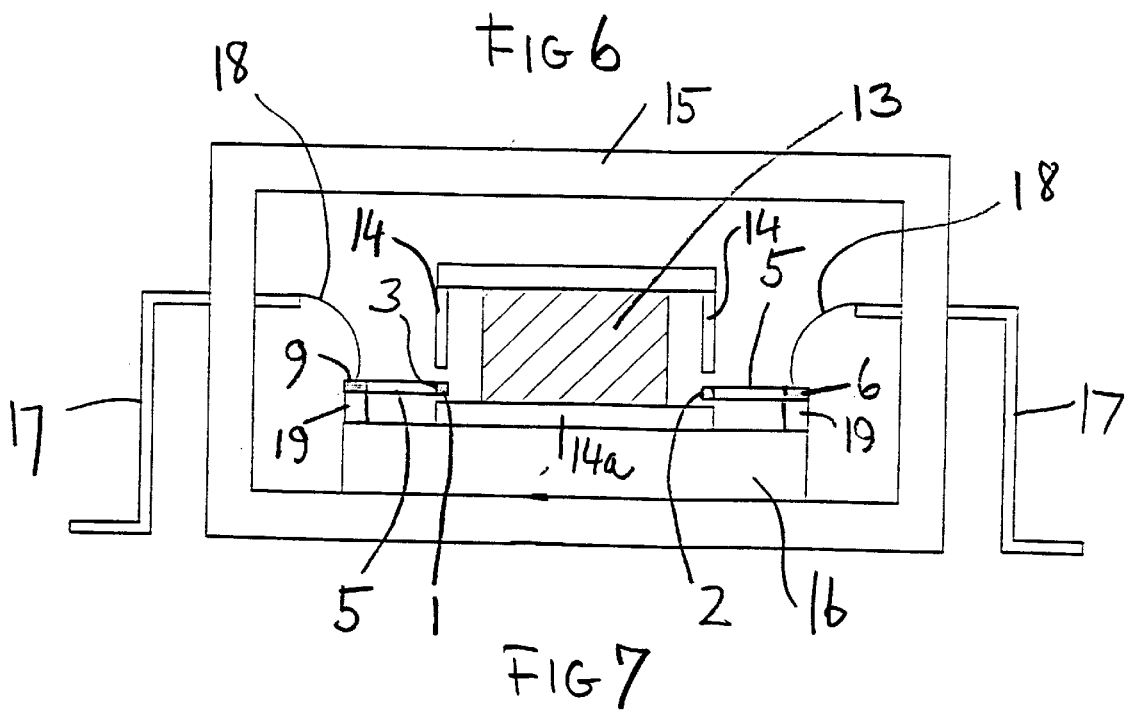
FIG. 7 is a diagrammatic cross sectional view similar to that of FIG. 5 through a vibrating structure gyroscope according to the present invention provided with a housing.

The ring pole means 14 preferably comprises magnetically soft pole pieces with a further portion 14a being provided underneath the ring or hoop-like shape structure area of the resonator 1 as can best be seen from FIGS. 5 and 7 of the accompanying drawings. The electromagnetic sensing means and the magnetic components 13, 14, 14a are preferably sealed in a housing 15 to produce a board mountable gyro which can function as an angular rate sensor. The housing 15 preferably is hermetically sealed and conveniently made from a kovar hybrid material. Kovar is a magnetic material and hence a non-magnetic spacer 16 is provided between the housing 15 and the silicon/magnetic parts of the gyroscope. In this way the gyroscope of the invention is rendered substantially insensitive to applied external magnetic fields. External connection pins 17 are provided through the housing 15 and lined in any convenient manner to the bond pads 9 such as by wire pigtail bonds 18.

The external rigid support frame 6 is mounted via a support pedestal 19 on the spacer 16. The support pedestal 19 may be of Silicon, bonded using Silicon wafer fusion bonding techniques. Alternatively the pedestal 19 may be of glass, bonded using anodic bonding techniques. The glass should be chosen closely to match the thermal expansion coefficient of the Silicon support means.

Various modifications and alterations may be made to the embodiments of the present invention described and illustrated, within the scope of the present invention as defined in the following claims.

What is claimed is:

1. A vibrating structure gyroscope including a substantially planar vibrating resonator having a substantially ring or hoop-like shape structure with inner and outer peripheries extending around a common axis, electromagnetic drive means for causing the resonator to vibrate, support means including a plurality of flexible support beams for supporting the resonator and for allowing the resonator to vibrate in response to the electromagnetic drive means, in a substantially undamped oscillation mode such as to permit the resonator to move relative to the support means in response to turning rate, which said support beams and said resonator are made from silicon, and electromagnetic sensing means for sensing movement of the resonator, which said electromagnetic drive means and said electromagnetic sensing means include metal tracks on the ring or hoop-like shape structure resonator and on the support beams, together with means for generating or providing a magnetic field substantially perpendicular to the plane of the vibratory resonator.

2. A gyroscope according to claim 1, wherein the support means also includes a frame which is substantially rigid, surrounds the resonator and is coupled to the outer periphery of the ring or hoop-like shape structure by the support beams which extend between the support means and the resonator.

3. A gyroscope according to claim 2, having eight equiangularly spaced support beams.

4. A gyroscope according to claim 1, wherein each support beam is provided with three laterally spaced tracks extending externally along its length which are connected at their outermost ends with respect to the resonator to bond pads and two of which at their innermost ends extend in opposite directions around an outer substantially planar surface of the resonator over a segment thereof and connect at their innermost ends to a respective one of the tracks on the immediately adjacent support beam, with the number of segments corresponding to the number of support beams.

5. A gyroscope according to claim 4, wherein of the three laterally spaced tracks on each support beam a centre track extends onto the resonator and terminates thereon adjacent the junction of the support beam and the resonator to provide a means for minimizing electrostatic coupling between the other two tracks on the support beam.

6. A gyroscope according to claim 5, including a silicon oxide layer on said outer substantially planar surface of the resonator and the support beams, between said tracks and the silicon of the support beams and the resonator, to insulate the tracks from the silicon, connecting points being provided through the silicon oxide layer at appropriate positions connecting the centre track to the silicon to reduce unwanted capacitive signal coupling between adjacent tracks.

7. A gyroscope according to claim 6, including means for passing current through an appropriate segment track to provide drive for the resonator and wherein the electromagnetic sensing means is such as to detect vibration of the resonator by detecting a voltage generated across an appropriate segment track as it moves in the perpendicular magnetic field.

8. A gyroscope according to claim 1, including ring pole means for concentrating the magnetic field on the ring or hoop-like shape structure of the resonator.

9. A gyroscope according to claim 1, including a housing made of magnetic material for containing the resonator, the magnetic field means, the support means, the electromagnetic drive means and the electromagnetic sensing means, with a non-magnetic spacer being provided between the housing and the support means.

* * * * *